(12) United States Patent
Borinelli

(10) Patent No.: US 10,695,808 B2
(45) Date of Patent: Jun. 30, 2020

(54) ALUMINUM FOIL ROLLING PROCESS

(71) Applicant: Fabrizio Guasta, Roddi (CN) (IT)

(72) Inventor: Giovanni Borinelli, Abbadia Lariana (IT)

(73) Assignee: Fabrizio Guasta, Roddi (CN) (IT)

( * ) Notice: Subject to any disclaimer, the term of this patent is extended or adjusted under 35 U.S.C. 154(b) by 16 days.

(21) Appl. No.: 16/069,338

(22) PCT Filed: Dec. 28, 2016

(86) PCT No.: PCT/IB2016/058043
§ 371 (c)(1),
(2) Date: Jul. 11, 2018

(87) PCT Pub. No.: WO2017/122075
PCT Pub. Date: Jul. 20, 2017

(65) Prior Publication Data
US 2019/0015881 A1 Jan. 17, 2019

(30) Foreign Application Priority Data

Jan. 14, 2016 (IT) .............................. UB2016A9972

(51) Int. Cl.
*B21B 1/38* (2006.01)
*B21B 45/02* (2006.01)
(Continued)

(52) U.S. Cl.
CPC ............ *B21B 1/38* (2013.01); *B21B 45/0251* (2013.01); *B21B 47/04* (2013.01); *B23P 25/00* (2013.01);
(Continued)

(58) Field of Classification Search
CPC . B21B 1/38; B21B 2001/383; B21B 45/0251; B21B 2003/001; B21B 47/04;
(Continued)

(56) References Cited

U.S. PATENT DOCUMENTS 2,529,884 A 11/1950 Reynolds
5,771,724 A * 6/1998 Hartung ................ B21B 37/165
72/11.8

(Continued)

FOREIGN PATENT DOCUMENTS

DE 19927697 A 12/2000
JP S577303 A 1/1982

Primary Examiner — Jermie E Cozart
(74) Attorney, Agent, or Firm — Volpe and Koenig, P.C.

(57) ABSTRACT

In an aluminum foil rolling process, first and second aluminum foils are provided, each having first and second faces, one face between the first and second faces is lubricated to obtain a first lubricated face. The foils are coupled to obtain a coupled foil having two outer faces and rolling the coupled foil, reducing the thickness of the coupled foil. One face between the two outer faces of the coupled foil is lubricated to obtain a coupled foil having a second lubricated face. The coupled foil is then wound to obtain a wound coupled foil. The coupled foil is partially separated by unwinding one of the first and second foils, to obtain a wound coupled foil. The wound coupled foil is unwound and rolled to obtain a coupled foil with reduced thickness and is then separated to obtain first and second foils with respective first and second reduced thicknesses.

10 Claims, 2 Drawing Sheets

(51) Int. Cl.
  *B21B 47/04* (2006.01)
  *B23P 25/00* (2006.01)
  *B21B 3/00* (2006.01)
  *B23P 13/02* (2006.01)
  *B21B 15/00* (2006.01)

(52) U.S. Cl.
  CPC ... *B21B 2001/383* (2013.01); *B21B 2003/001* (2013.01); *B21B 2015/0057* (2013.01); *B21B 2015/0064* (2013.01); *B23P 13/02* (2013.01); *B23P 2700/12* (2013.01)

(58) Field of Classification Search
  CPC ..... B21B 2015/0064; B21B 2015/0057; B23P 13/02; B23P 25/00; B23P 2700/12
  See application file for complete search history.

(56) References Cited

U.S. PATENT DOCUMENTS

| | | | | |
|---|---|---|---|---|
| 2004/0088840 A1* | 5/2004 | Miller | ........................ | B21B 1/40 29/17.6 |
| 2007/0237978 A1* | 10/2007 | Schubert | ................... | B21B 1/40 428/607 |
| 2010/0242559 A1* | 9/2010 | Saenz de Miera | ....... | B21B 1/38 72/207 |

* cited by examiner

ALUMINUM FOIL ROLLING PROCESS

FIELD OF THE INVENTION

In its more general aspect the present invention relates to a process for making aluminium foils with reduced thickness, for example but not exclusively, for use as flexible packaging, and in particular relates to an aluminium foil rolling process.

STATE OF THE ART

As it is known in packaging and conserving fields, for example of foods but also drugs, aluminium foils of reduced thickness are usually employed.

Aluminium foils of the aforementioned type, widely but improperly known also as tin foil or silver paper, are in practice foils with thickness of the order of some thousandth of millimeter, obtained by rolling aluminium foils having larger thickness.

In order to reduce the thickness of the aluminium foils to the desired value, the known art provided some processes wherein, after some steps of singly rolling in which each foil is rolled individually, a final doubly rolling step is provided wherein two coupled foils, i.e. overlapped one to another, are rolled together.

The coupling of two aluminium foils, also named as doubling, can be carried out substantially concurrently with the rolling, thus in the same machine named rolling mill, or it can be carried out before the rolling in a different machine named doubling machine and arranged upstream of the rolling mill.

In each case between the two aluminium foils to be coupled, before the doubly rolling, a lubricant is inserted preventing the contacting faces of the aluminium foils from remaining bound one to another, thus allowing the two coupled foils to be then separated and singularly wound in respective bobbins.

Although favorable, solutions as the aforesaid ones are not free from drawbacks, among which low productivity due to the need to use high number of singly rolling steps in order to obtain suitable thicknesses, and the limit itself of the obtainable thicknesses.

Moreover it is known a process wherein two coupled aluminium foils, between which a lubricant is inserted, are doubly rolled a first time, then separated to be subsequently doubly rolled a second time upon newly inserting another lubricant between them.

In practice in such a process, before each doubly rolling step the insertion of lubricant between the foils to be coupled is provided, thus the prior separating the foils if already coupled and rolled together in a preceding doubly rolling step.

Such a process requires however a particularly complex rolling system and adopting complicated technical solutions, that in practice strongly limit the advantages of providing several doubly rolling steps.

SUMMARY OF THE INVENTION

The technical problem underlying the present invention has been to provide a process for making aluminium foils with reduced thickness having characteristics such as to overcome the drawbacks mentioned above with reference to the known art.

In accordance with the present invention, the afore said problem is solved by an aluminium foils rolling process comprising the steps of:
a) providing at least one first aluminium foil and one second aluminium foil each having a respective first face and a respective second face;
b) lubricating, at least partially, at least one face between the afore said first face and the afore said second face of at least one aluminium foil between the afore said first aluminium foil and the afore said second aluminium foil, thereby obtaining at least one first lubricated face;
c) coupling the afore said first aluminium foil with the afore said second aluminium foil, so that the afore said at least one first lubricated face is a contact face between the afore said first aluminium foil and the afore said second aluminium foil, thereby obtaining a coupled foil having two outer faces;
d) rolling the afore said coupled foil with reduction of the thickness of the afore said coupled foil;
e) lubricating, at least partially, at least one face between the afore said two outer faces of the afore said coupled foil, thereby obtaining a coupled foil having at least one second lubricated face;
f) winding at least partially the afore said coupled foil having at least one second lubricated face, obtaining a coupled foil at least partially wound comprising n turns;
g) partially separating the afore said at least partially wound coupled foil by unwinding one of the afore said first aluminium foil and the afore said second aluminium foil, at least of one turn, thereby obtaining an at least partially wound coupled foil comprising an end portion constituted by a respective portion of only one of the afore said first aluminium foil and the afore said second aluminium foil;
h) unwinding the afore said at least partially wound coupled foil thereby obtaining a coupled foil wherein the afore said second lubricated face is a contact face between the afore said first aluminium foil and the afore said second aluminium foil;
i) rolling the afore said coupled foil wherein the afore said second lubricated face is a contact face between the afore said first aluminium foil and the afore said second aluminium foil thereby obtaining a coupled foil with reduced thickness;
l) separating the afore said coupled foil with reduced thickness thereby obtaining a first aluminium foil with a first reduced thickness and a second aluminium foil with a second reduced thickness.

In practice, in accordance with the invention, two aluminium foils overlapped one to another to form a coupled foil are doubly rolled several times, i.e. together, without the need of wholly separating the same between a doubly rolling step and a subsequent doubly rolling step to interpose some lubricant between them, rather the two aluminium foils remain mostly overlapped to form the coupled foil that is wound (rolled up) after a doubly rolling step and unwound (unrolled) before the subsequent doubly rolling step, or substantially concurrently therewith, upon lubricating before the afore said subsequent doubly laminating step of at least one its outer face and partially unwinding only one of the two aluminium foils, thus with separation of the coupled foil only limited to the outermost turn of the afore said n turns of the wound coupled foil.

In this way, the lubricant arranged on an outer face of the coupled foil before its winding (rolling up) and subsequent doubly rolling, will be interposed between the two coupled aluminium foils during the unwinding (unrolling) preceding such a subsequent doubly rolling step.

Preferably, the afore said process comprises a step m), wherein the afore said end portion constituted by a respective portion of only one of the afore said first aluminium foil and the afore said second aluminium foil, obtained in the afore said step g), is removed from the coupled foil, preferably removed by cutting the same.

In accordance with the invention, the afore said step e) can precede the afore said step d) or be substantially concurrent therewith, as well as it can precede the afore said step f) or be substantially concurrent therewith.

Preferably, in the afore said step e), both the afore said outer faces of the afore said coupled foil are lubricated.

Preferably, in the afore said step b), two faces are lubricated, one face per each of the afore said first aluminium foil and second aluminium foil.

Preferably, between the afore said step a) and the afore said step b), the afore said process comprises at least one step n) of singly rolling, wherein at least one of the afore said first aluminium foil and the afore said second aluminium foil is individually rolled.

Preferably, the afore said process comprises a step o) of lubricating wherein at least one outer face of the coupled foil with reduced thickness obtained in the afore said step i) is at least partially lubricated, in particular if a further doubly rolling step is provided.

Therefore, preferably, after the afore said step o), the afore said process comprises further steps essentially similar to the afore said steps f), g), h) and i).

Preferably, the afore said process comprises a final step p) wherein the afore said first aluminium foil with a first reduced thickness and the afore said second aluminium foil with a second reduced thickness are singly wound in respective bobbins.

BRIEF DESCRIPTION OF THE FIGURES

Further characteristics and advantages of the invention will be more evident by the review of the following description of some preferred but not exclusive embodiments, shown for illustration purposes and without limitation, wherein.

DETAILED DESCRIPTION OF THE INVENTION

Figure 1:
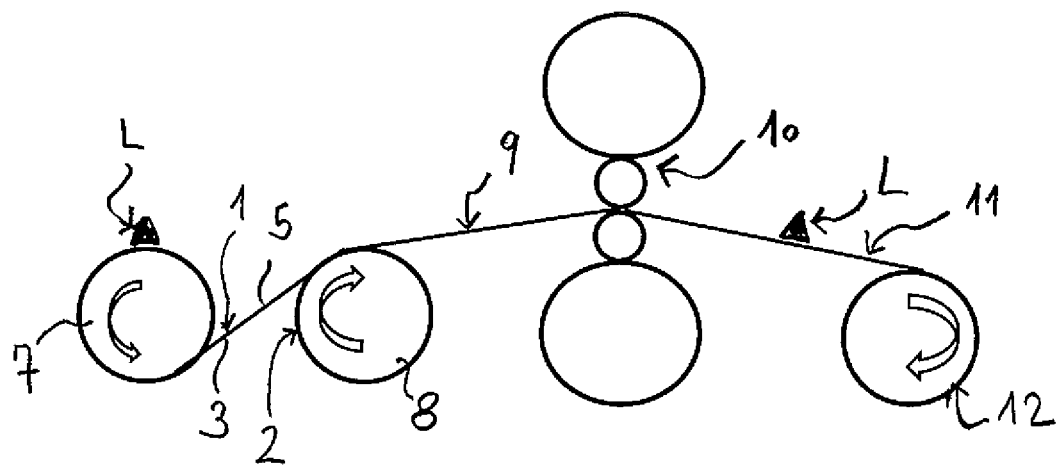
FIG. 1 shows schematically some working steps of a rolling process of aluminium foils in accordance with the present invention, among which a doubly rolling step of a first aluminium foil and a second aluminium foil.
Figure 2:
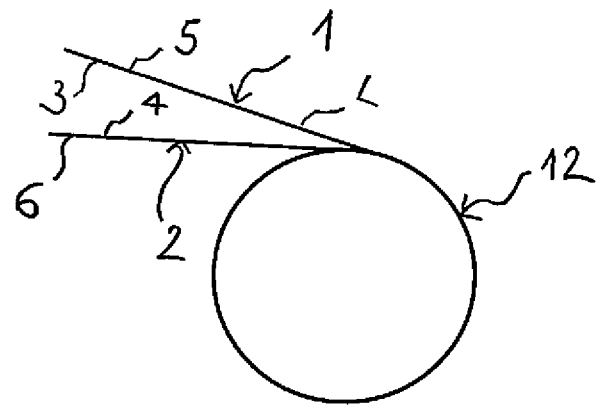
FIG. 2 shows an at least partially wound coupled foil obtained from the afore said doubly rolling step shown in FIG. 1, wherein the afore said coupled foil comprises n turns and a second lubricated face, wherein the afore said second lubricated face is an outer face of the afore said coupled foil.
Figure 3:
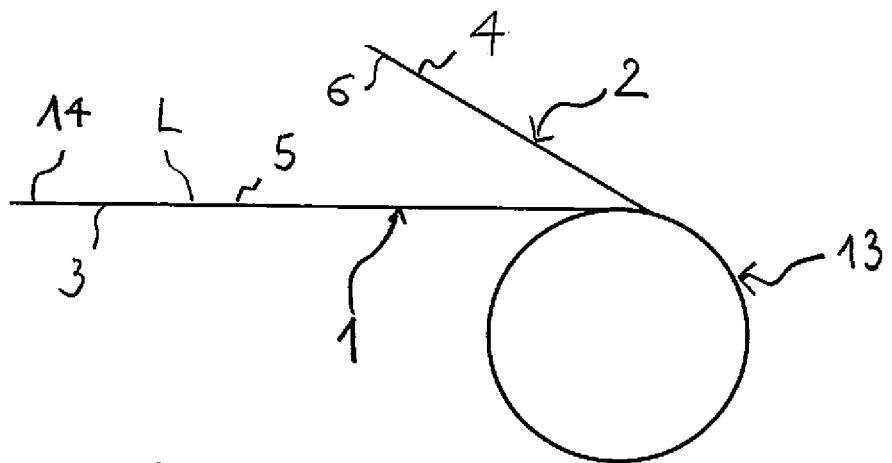
FIG. 3 shows an at least partially wound coupled foil comprising an end portion constituted by a respective portion of only one of the afore said first aluminium foil and the afore said second aluminium foil, obtained from a separating step in which, in the afore said coupled foil obtained by the afore said doubly rolling step of FIG. 2, one of the afore said first aluminium foil and the afore said second aluminium foil is unwound of one turn, wherein the afore said second lubricated face is a contact face between the afore said first aluminium foil and the afore said second aluminium foil.
Figure 4:
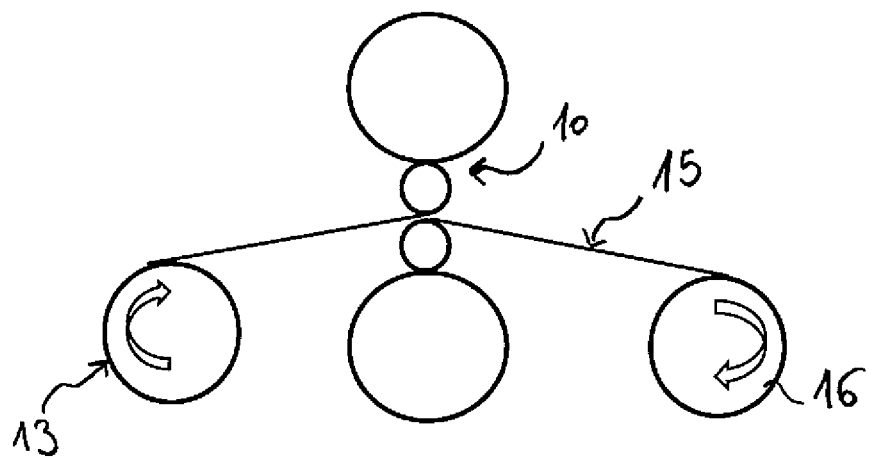
FIG. 4 shows a further doubly rolling step of the process according to the present invention, subsequent the afore said separating step.

Referring to FIGS. 1-4 an aluminium foil rolling process according to the present invention is described.

The present process substantially comprises at least two doubly rolling steps, wherein a first aluminium foil denoted with 1, and a second aluminium foil denoted with 2, are coupled rolled, and wherein between the two steps of doubly rolling the first and second aluminium foils remain substantially overlapped one to another, as it will be better evident in the following.

In detail, the first aluminium foil 1 and the second aluminium foil 2, each having a respective first face 3, 4 and a respective second face 5, 6, where appropriate can be subjected to one or more singly rolling steps, wherein each aluminium foil is individually rolled in order to reduce the initial thickness thereof, such singly rolling steps not being depicted in figures.

Therefore, for a first doubly rolling step between the first aluminium foil 1 and the second aluminium foil 2, a lubricant denoted with L is inserted.

In particular, a lubricating step (step b) is provided, wherein at least one face of the first face and the second face of at least one aluminium foil between the first aluminium foil and the second aluminium foil is at least partially lubricated, for example by spraying lubricant, thereby obtaining a respective first lubricated face.

In accordance with the examples of the figures, the first face 3 of the first aluminium foil 1 is lubricated while the latter is unrolled from a respective first bobbin 7, while the second aluminium foil 2 is unrolled from a respective second bobbin 8.

Therefore a coupling step of the first aluminium foil with the second aluminium foil 2 is provided, also defined as doubling step (step c), wherein the first aluminium foil 1 is overlapped to the second aluminium foil 2 so that the first lubricated face, specifically the first face 3 of the first aluminium foil 1, is a contact face between the first aluminium foil 1 and the second aluminium foil 2.

From the doubling step a coupled foil 9 is obtained and has two outer faces, that is subjected to a rolling step (step d) that causes a reduction of the thickness thereof, for example by a conventional rolling mill 10.

The rolling step of the coupled foil 9 is also described as doubly rolling.

In accordance with the invention, the coupled foil 9 is lubricated on at least one of its two outer faces, for example by spraying other lubricant L.

In particular a lubricating step (step e) is provided, leading to obtain a coupled foil having at least one second lubricated face, in the examples of the figures denoted with 11 on the whole.

In accordance with the examples of the figures, the lubricating of an outer face of the coupled foil 9 occurs after the doubly rolling step, the possibility of lubricating an outer face of the coupled foil before the doubly rolling step not being however excluded.

Therefore a winding step (step f) is provided, wherein the coupled foil having a second lubricated face 11 is rolled up, thereby obtaining a wound coupled foil comprising n turns, denoted with 12.

Substantially the coupled foil having a second lubricated face 11 is wound n times to form a respective bobbin comprising the afore said n turns.

In accordance with the invention a step of partially separating the wound coupled foil 12 (step g) is provided, wherein one of the first aluminium foil 1 and the second aluminium foil 2 is unrolled of one turn.

In particular, in accordance with the examples of the figures, in the wound coupled foil 12 the first aluminium foil 1 is unwound of one turn, therefore of one spiral, i.e. the outermost portion thereof in the afore said bobbin.

A wound coupled foil is therefore obtained, on the whole denoted with 13, comprising an end portion 14 constituted by a respective portion of only one of the first aluminium foil and the second aluminium foil, in accordance with the examples of the figures such an end portion 14 being constituted by a respective portion of the first aluminium foil 1.

In this way, the lubricant L initially arranged on an outer face of the coupled foil will be interposed between the first and second aluminium foils, the position of the two aluminium foils being reversed in the wound coupled foil 13 after the unwinding of one turn, which is limited to only one of the aluminium foils.

In accordance with the invention the wound coupled foil 13 is thus unwound, i.e. unrolled, to be doubly rolled.

In detail, a step of unwinding the wound coupled foil (step h), wherein the afore said second lubricated face is a contact face between the first aluminium foil 1 and the second aluminium foil 2, and a doubly rolling step (second doubly rolling or step i) of the same coupled foil, wherein the second lubricated face is a contact face between the first aluminium foil 1 and the second aluminium foil 2, are therefore provided, thereby obtaining a coupled foil with reduced thickness, denoted with 15 on the whole.

The second rolling step is carried out in a rolling mill of the afore mentioned type, always denoted with 10.

The coupled foil 15 with reduced thickness is then separated and a first aluminium foil with a first reduced thickness and a second aluminium foil with a second reduced thickness are obtained and are singularly wound to form respective bobbins, not shown in the figures.

In particular, the coupled foil 15 with reduced thickness can be separated in the single foils directly after the second doubly rolling, or subsequently after being wound to form a respective bobbin 16.

In practice, in accordance with the invention, a coupled foil can be rolled at least twice without separating one from another the aluminium foils composing the same, still having a lubricant interposed between them, the lubricant being required in order to prevent the aluminium foils from being bound one to another and to be able to separate them at the end of the rolling process.

In case other doubly rolling steps are desired, the present invention comprises a further lubricating step (step o), wherein at least one outer face of the coupled foil with reduced thickness obtained in the step i) is at least partially lubricated, therefore the carrying out of steps essentially similar to the afore mentioned steps f), g), h) and i) and to which description is referred.

In regard to the end portion 14 constituted by a respective portion of only one of the first aluminium foil and the second aluminium foil of the coupled foil, it has to be said that it can be rolled in the second doubly rolling step, or removed from the coupled foil in a dedicated removing step m), for example by cutting the same.

With regard to the afore said step e), it has to be added that it can precede the afore said step d) or be substantially concurrent therewith, as well as it can precede the afore said step f) or be substantially concurrent therewith, the case in which the step e) is comprised between the step d) and the step f) being shown in the examples of figures.

Again it has to be said that, when required, in step e) and step b) several faces can be lubricated, and precisely both the two outer faces of the coupled foil and, for example, one face per each of the first and second aluminium foils.

The advantages of the present invention, already appeared evident throughout the present description, can be summarized by pointing out that an aluminium foil rolling process is provided and has increased productivity thanks to the possibility of carrying out several doubly rolling processes, without the need of separating the foils to interpose between them the lubricant needed to separate the aluminium foils at the end of the process.

In addition to the increased productivity, the present process allows obtaining aluminium foils with particularly reduced thickness.

In order to meet incidental and specific requirements, several variations and modifications could be made by a field technician to the illustrated and described embodiments of present invention, provided that all are included in the scope of protection of the invention as defined by the following claims.

The invention claimed is:

1. An aluminum foil rolling process comprising the steps of:
   a) providing at least one first aluminum foil (1) and one second aluminum foil (2) each having a respective first face (3, 4) and a respective second face (5, 6);
   b) lubricating, at least partially, at least one face between said first face (3, 4) and said second face (5, 6) of at least one aluminum foil between said first aluminum foil (1) and said second aluminum foil (2), thereby obtaining at least one first lubricated face;
   c) coupling said first aluminum foil (1) with said second aluminum foil, so that said at least one first lubricated face is a contact face between said first aluminum foil and said second aluminum foil, thereby obtaining a coupled foil (9) having two outer faces;
   d) rolling said coupled foil (9) with reduction of the thickness of said coupled foil;
   e) lubricating, at least partially, at least one face between said two outer faces of said coupled foil (9), thereby obtaining a coupled foil having at least one second lubricated face (11);
   f) winding at least partially said coupled foil having at least one second lubricated face (11), obtaining an at least partially wound coupled foil (12) comprising n turns;
   g) partially separating said at least partially wound coupled foil by unwinding one of said first aluminum foil (1) and said second aluminum foil (2), at least of one turn, thereby obtaining an at least partially wound coupled foil (13) comprising an end portion (14) constituted by a respective portion of only one of said first aluminum foil (1) and said second aluminum foil (2);
   h) unwinding said at least partially wound coupled foil (13) thereby obtaining a coupled foil wherein said second lubricated face is a contact face between said first aluminum foil (1) and said second aluminum foil (2);
   i) rolling said coupled foil wherein said second lubricated face is a contact face between said first aluminum foil (1) and said second aluminum foil (2) thereby obtaining a coupled foil (15) with reduced thickness; and
   l) separating said coupled foil (15) with reduced thickness thereby obtaining a first aluminum foil with a first reduced thickness and a second aluminum foil with a second reduced thickness.

2. The process according to claim 1, wherein before said step i) a step m) is comprised, wherein said end portion (14) constituted by a respective portion of only one of said first aluminum foil and said second aluminum foil is removed from the coupled foil.

3. The process according to claim 1, wherein said step e) precedes said step d) or is substantially concurrent therewith.

4. The process according to claim 1, wherein said step e) precedes said step f) or is substantially concurrent therewith.

5. The process according to claim 1, wherein in said step e) both said two outer faces of said coupled foil are lubricated.

6. The process according to claim 1, wherein in said step b) two faces are lubricated, one face per each of said first aluminum foil (1) and second aluminum foil (2).

7. The process according to claim 1, wherein between said step a) and said step b) there is at least one step n) of singly rolling, wherein at least one of said first aluminum foil and said second aluminum foil is rolled individually.

8. The process according to claim 1, further comprising a step o) of lubricating, wherein at least one outer face of said coupled foil (15) with reduced thickness, obtained in said step i), is lubricated.

9. The process according to claim 8, comprising a further rolling step wherein, before said step l), said coupled foil with reduced thickness having at least one lubricated outer face obtained in said step o) is rolled.

10. The process according to claim 1, comprising a winding step, wherein said first aluminum foil with a first reduced thickness and said second aluminum foil with a second reduced thickness both obtained in said step l) are singularly wound.

* * * * *